(12) United States Patent
Schechter et al.

(10) Patent No.: US 8,060,524 B2
(45) Date of Patent: Nov. 15, 2011

(54) HISTORY ANSWER FOR RE-FINDING SEARCH RESULTS

(75) Inventors: Michael Austin Schechter, Sammamish, WA (US); Ramez Naam, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 333 days.

(21) Appl. No.: 12/333,070

(22) Filed: Dec. 11, 2008

(65) Prior Publication Data

US 2010/0153428 A1    Jun. 17, 2010

(51) Int. Cl.
G06F 7/00 (2006.01)
G06F 17/30 (2006.01)

(52) U.S. Cl. ........ 707/768; 707/763; 707/765; 707/766; 707/767

(58) Field of Classification Search .................. None
See application file for complete search history.

(56) References Cited

U.S. PATENT DOCUMENTS

| | | | |
|---|---|---|---|
| 5,265,014 A * | 11/1993 | Haddock et al. .................. 704/9 |
| 5,911,138 A | 6/1999 | Li |
| 6,493,702 B1 | 12/2002 | Adar et al. |
| 6,707,309 B2 * | 3/2004 | Sato et al. ................ 324/750.25 |
| 6,957,390 B2 | 10/2005 | Tamir |
| 7,158,966 B2 | 1/2007 | Brill |
| 7,483,894 B2 * | 1/2009 | Cao ...................................... 1/1 |
| 7,714,927 B2 * | 5/2010 | Terashima .................... 348/345 |
| 7,730,054 B1 * | 6/2010 | Marmaros et al. ............ 707/713 |
| 2005/0076003 A1 | 4/2005 | DuBose |
| 2005/0102202 A1 | 5/2005 | Linden et al. |
| 2005/0154730 A1 | 7/2005 | Miller et al. |
| 2006/0064411 A1 * | 3/2006 | Gross et al. ....................... 707/3 |
| 2006/0224587 A1 | 10/2006 | Zamir |
| 2006/0248059 A1 | 11/2006 | Chi |
| 2007/0043706 A1 | 2/2007 | Burke et al. |
| 2007/0180051 A1 | 8/2007 | Kelly et al. |
| 2007/0192293 A1 | 8/2007 | Swen |
| 2007/0266002 A1 * | 11/2007 | Chowdhury et al. ............. 707/2 |
| 2007/0294615 A1 | 12/2007 | Sathe |
| 2008/0021884 A1 | 1/2008 | Jones et al. |

(Continued)

FOREIGN PATENT DOCUMENTS

JP    2001109752    4/2001

(Continued)

OTHER PUBLICATIONS

Jaime Teevan, Eytan Adar, Rose Jones and Michael Potts, "History Repeats Itself: Repeat Queries in Yahoo's Logs," Copyright SIGIR '06, Aug. 6-10, 2006, Seattle, WA, USA, 2pp. http://people.csail.mit.edu/teevan/work/publications/posters/sigir06.pdf.

(Continued)

Primary Examiner — Khanh Pham
Assistant Examiner — Azam Cheema
(74) Attorney, Agent, or Firm — Shook Hardy & Bacon, LLP (57) ABSTRACT

A system, method, and medium are provided for providing a personalized answer to a user-defined search query by utilizing the user's search history. A search session is instantiated, and search queries, search results, user selections of search results, and other information is recorded. A search query is received and analyzed to determine whether the query reflects user intent to re-find a search result that the user previously was presented in response to a previously issued search query. Search results pages provided to the user in response to queries include a personalized history answer that represents a previously viewed search result that the user may be attempting to re-find.

20 Claims, 8 Drawing Sheets

U.S. PATENT DOCUMENTS

| | | | |
|---|---|---|---|
| 2008/0027799 A1* | 1/2008 | Hao et al. | 705/14 |
| 2008/0033922 A1 | 2/2008 | Cisler | |
| 2008/0033970 A1 | 2/2008 | Jones et al. | |
| 2008/0065617 A1 | 3/2008 | Burke et al. | |
| 2008/0114751 A1 | 5/2008 | Cramer | |
| 2008/0120278 A1 | 5/2008 | Roe | |
| 2009/0070299 A1* | 3/2009 | Parikh et al. | 707/3 |
| 2009/0089311 A1* | 4/2009 | Chi et al. | 707/102 |
| 2009/0119254 A1* | 5/2009 | Cross et al. | 707/3 |

FOREIGN PATENT DOCUMENTS

| | | |
|---|---|---|
| KR | 1019950001505 | 1/1995 |

OTHER PUBLICATIONS

Beverly Yang and Glen Jeh, "Retroactive Answering of Search Queries," Copyright by International World Wide Web Conference Committee (IW3C2), WWW 2006, May 23-26, 2006, Edinburgh, Scotland, 10 pp. http://www2006.org/programme/files/pdf/3055.pdf.

Dan Morris, Meredith Ringel Morris and Gina Venolia, "SearchBar: A Search-Centric Web History for Task Resumption and Information Re-finding," Microsoft Research, Redmond, WA, USA, 10 pp. http://research.microsoft.com/cue/publications/SearchBarCHI2008.pdf.

Shady Elbassouni, "Adaptive Personalization of Web Search," Master's Thesis Paper, Universitas des Saarlandes, FR Informatik Max-Plank-Institut fur Informatik, AG 5, Jun. 27, 2007, 84 pp. http://www.mpi-inf.mpg.de/~elbass/downloads/elbassmasters.pdf.

Jaime Teevan, "Supporting Finding and Re-Finding Through Personalization," Thesis Paper, Massachusetts Institute of Technology, Feb. 2007, 176 pp. http://people.csail.mit.edu/teevan/work/publications/theses/phd/thesis.pdf.

International Search Report and Written Opinion mailed Jun. 10, 2010 in International Application No. PCT/US2009/064798.

Non-Final Office Action mailed Mar. 1, 2011 in U.S. Appl. No. 12/332,996.

(No Author Listed), "Basic Search and Beyond," PAGLO.COM Webpage, Aug. 1, 2008, 16 pp.

(No Author Listed), "Google Talks Tracking," HUOMAH.COM Webpage, 2008, 7 pp.

Notess, Greg R., "Tracking Your Search History," Reference Librarian, Montana State University, vol. 30, No. 2, Mar./Apr. 2006, 3 pp.

Perez, Juan Carlos, "Google Feature Logs Users' Histories," IDG News Service, Apr. 21, 2006, 3 pp.

Piwowarkski, Benjamin, and Hugo Zaragoza, "Predictive User Click Models Based on Click-Through History," Article. ACM Magazine, Nov. 6, 2007, Lisboa, Portugal, 8 pp.

Sullivan, Danny, "Google Search History Expands, Becomes Web History," Webpage, Apr. 19, 2007, 13 pp.

Notice of Allowance in U.S. Appl. No. 12/332,996 mailed Aug. 17, 2011, 14 pages.

\* cited by examiner

HISTORY ANSWER FOR RE-FINDING SEARCH RESULTS

CROSS-REFERENCE TO RELATED APPLICATIONS

The present application is related by subject matter to U.S. patent application Ser. No. 12/332,996, filed Dec. 11, 2008, entitled "PROVIDING RECENT HISTORY WITH SEARCH RESULTS,".

BACKGROUND

Studies have shown that for the typical search service user, at least half of the queries that a user issues are attempts to re-find information that the user has seen in a previous search session or previously in the same search session. Users are often unsuccessful in re-finding the information due to various factors, which include the inability of the user to remember the exact search terms previously used, rank changes within the index, and the inability for the user to recognize search results that they have previously seen.

SUMMARY

The invention is defined by the claims below. This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention allow for providing a personalized history answer to a user search query based on an inference that the user is attempting to re-find information that the user has previously seen. According to embodiments of the present invention, when a user uses the search service, search queries issued by the user, search results presented in response, user selection of results, and other information is recorded and associated with a user history profile. During subsequent searches, a history answer service attempts to determine whether the user is attempting to re-find information that the user has previously seen. If the query appears to be an attempt to access previously seen information, a personalized history answer is displayed, which is a representation of one or more search results that the user may be attempting to re-find.

These and other aspects of the invention will become apparent to one of ordinary skill in the art upon a reading of the following description, drawings, and the claims.

BRIEF DESCRIPTION OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

As indicated above, embodiments of the present invention provide for presenting a personalized history answer to a user-defined search query based on an inference that the user is attempting to re-find information that was provided to the user in response to a previous query. According to a first illustrative aspect of the invention, a computer-readable medium is provided that includes instructions for performing an exemplary method for providing a personalized answer to a user-defined search query based on the user's search history. In an embodiment, the exemplary method includes receiving a first search query issued by a user. Embodiments of the exemplary method further include referencing a history profile corresponding to the user. The history profile includes a data representation of a first search result that was provided to the user in response to a second search query issued by the user. The exemplary method also includes inferring that the first search query reflects user intent to re-find the first search result and displaying the first search result.

According to another illustrative aspect of the present invention, a computer-readable medium is provided that includes instructions for performing another exemplary method for providing a personalized answer to a user-defined search query based on the user's search history. In an embodiment, the exemplary method includes receiving a plurality of search queries issued by a user and recording a data representation of each of the search queries. Embodiments of the exemplary method further include recording data representations of search results provided in response to the search queries, as well as selection indications indicating user selection of search results. The recorded data is associated with a history profile corresponding to the user. In an embodiment, the exemplary method further includes receiving a first search query issued by the user, referencing the history profile, inferring that the first search query reflects user intent to re-find at least one of the search results represented in the history profile, and displaying the search result or results.

According to a third illustrative aspect of the present invention, a computer-readable medium is provided that includes instructions for performing another exemplary method for providing a personalized answer to a user-defined search query based on the user's search history. In embodiments, the exemplary method includes receiving a first search query issued by a user and identifying a first search result satisfying that query. Data representations of search query and search result are recorded and associated with a history profile corresponding to the user. A second search query is received and a second search result is identified that satisfies the second query. Data representations of the second query and result are recorded and associated with the history profile. In an embodiment, the exemplary method further includes receiving a third search query, referencing the history profile, and inferring that the third search query reflects user intent to re-find the first search result. Upon determining that the first search result satisfies a re-find firing constraint, the first search result is displayed.

Figure 1:
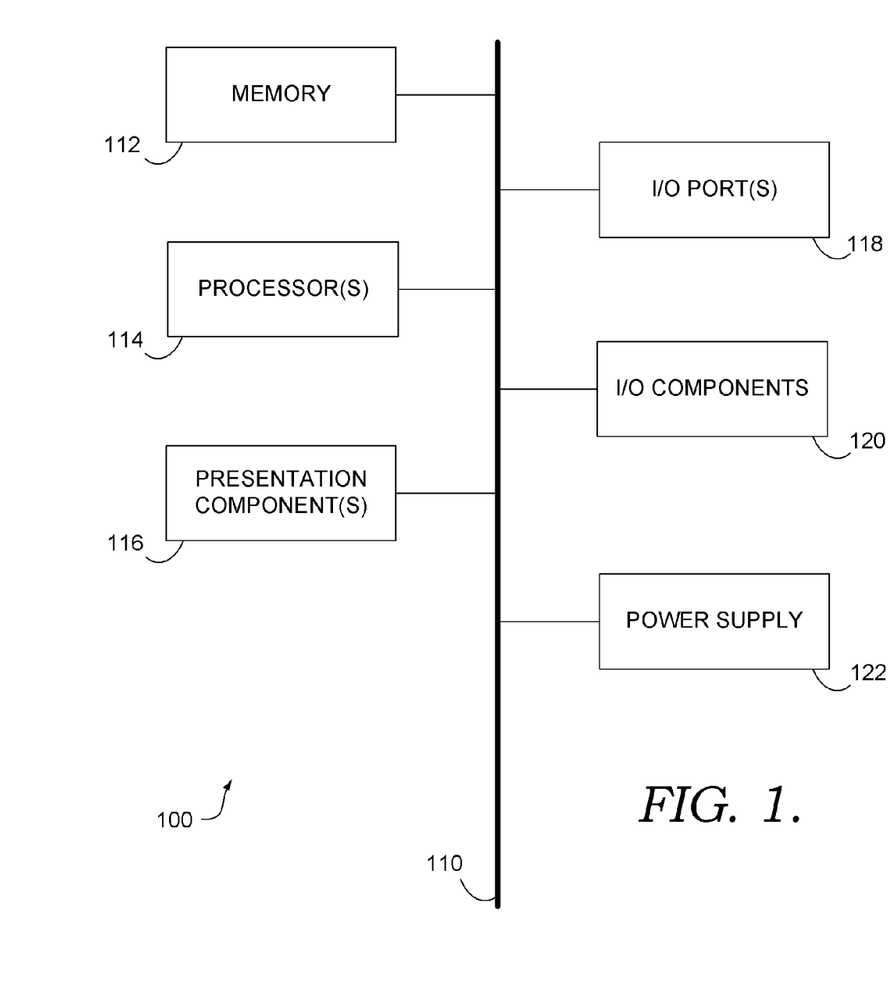
FIG. 1 is a block diagram of an exemplary computing environment suitable for use in implementing the present invention.

An exemplary operating environment in which various aspects of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, an exemplary computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer-readable storage media. Computer-readable storage media includes both volatile and nonvolatile, removable and non-removable media implemented in any method or technology for storage of information such as computer-readable instructions, data structures, program modules or other data. Computer-readable storage media includes, but is not limited to, RAM, ROM, EPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, and the like.

I/O ports 118 allow computing device 100 to be logically coupled to other devices including I/O components 120, some of which may be built in. Illustrative components include a microphone, joystick, game pad, satellite dish, scanner, printer, wireless device, keyboard, pen, voice input device, touch input device, touch-screen device, interactive display device, or a mouse.

Figure 2:
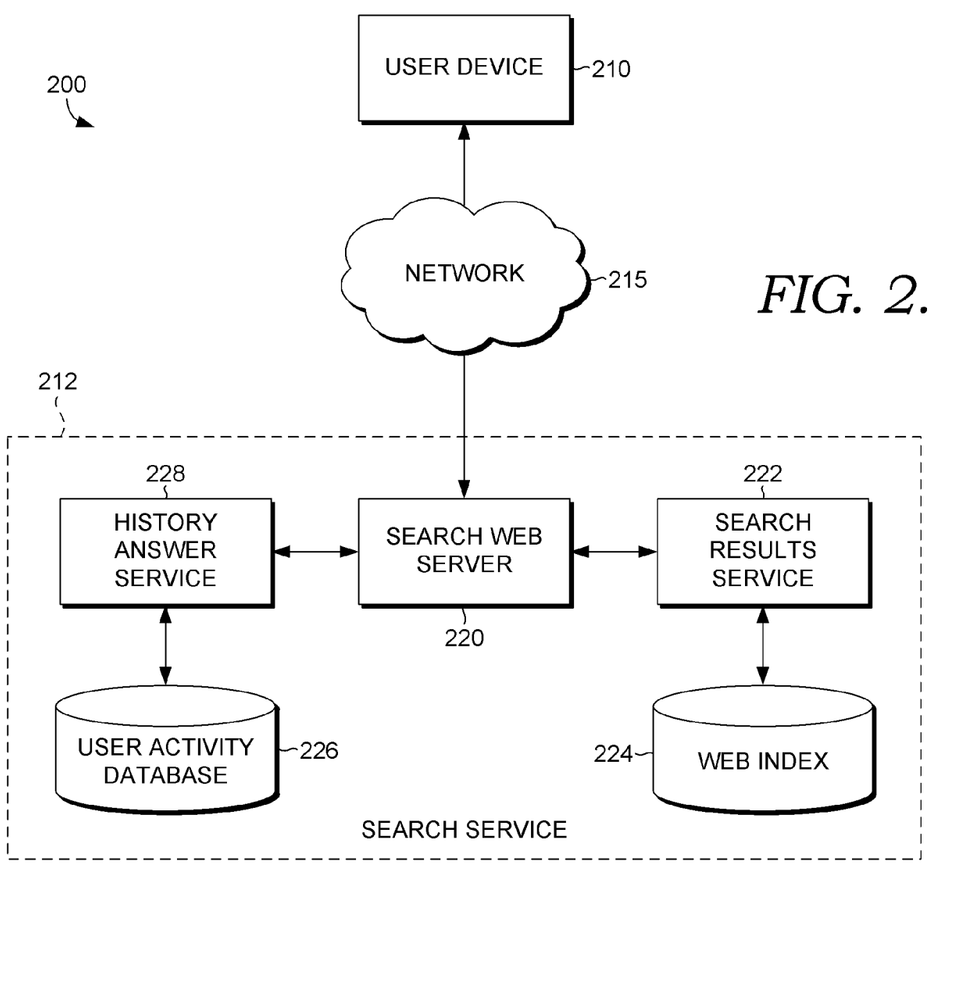
FIG. 2 is a block diagram illustrating an exemplary networking environment according to embodiments of the present invention.

As previously mentioned, in one embodiment, the present invention relates to providing a personalized answer to a user-defined search query based on the user's search history. Turning to FIG. 2, a block diagram is shown, illustrating the relevant components of an exemplary networking environment 200 according to an embodiment of the present invention. Exemplary networking environment 200 is an environment that provides search services to a user, wherein the user may submit a query, i.e. perform a search, and retrieve search results in response. Exemplary networking environment 200 includes a user device 210, a search service 212, and a network 215 through which the user device 210 and search service 212 can communicate. As illustrated further in FIG. 2, search service 212 includes a number of different components, some of which are depicted herein. For instance, in the illustrated embodiment, search service 212 includes a search web server 220, a search results service 222, a web index 224, a user activity database 226, and a session tracker service 228.

It should be understood that the networking elements illustrated in FIG. 2 are scalable. That is, there may be any number of user devices, search services and networks associated with a particular networking environment. Moreover, the components of search service 212 are similarly scalable, as a search service 212 can have any number of components such as those illustrated in FIG. 2. Additionally, there may be other elements not shown in FIG. 2 that provide various functionalities, services, interfaces, and the like. The exemplary networking environment 200 is only one of a number of possible configurations, and is illustrated as having a limited number of network elements for simplicity and clarity. The illustrations and descriptions herein are not intended to limit the functionality, configuration, or other aspect of any network suitable for implementing embodiments of the present invention.

Search service 212, as well as any or all of the components 220, 222, 224, 226, and 228 thereof illustrated in FIG. 2 may be implemented as server systems, program modules, virtual machines, components of a server or servers, networks, and the like. In one embodiment, for example, each of the components 220, 222, 224, 226, and 228 is implemented on a separate machine. In another embodiment, all of the components 220, 222, 224, 226, and 228 are implemented on a single server or a bank of servers.

User device 210, illustrated in FIG. 2, is a communication device that a user can utilize to perform a search by submitting a query to the search server 212. User device 210 can be a computing device such as computing device 100 described above with reference to FIG. 1, although the nature of user device 210 is not limited to this description. In various embodiments, user device 210 includes a unique machine identifier (MID) such as a MAC address, an internet protocol (IP) address or the like. In embodiments, the machine identifier is always the same for user device 210, and in other embodiments, the machine identifier is dynamically assigned upon connection to a network, communication with a particular server, or the like. The term machine identifier, as used herein, is intended to encompass any variation of these types of identifiers, and is to be differentiated from a user identifier (UID), which is associated with a user regardless of the machine that the user operates.

As shown in FIG. 2, user device 210 communicates with search web server 220 via network 215. Search web server 220 receives user-defined search queries, i.e., search queries issued by a user, from user device 210. Search web server 220 may be or include, for example, a search engine, a crawler, or the like. Search web server 220, in some embodiments, is configured to perform a search using a query submitted by user device 210. In other embodiments, search server forwards the user query to another network element such as, for example, search results service 222, which may perform the search. In various embodiments, search web server 220 can provide a user interface for facilitating a search experience for a user communicating with user device 210.

As illustrated in FIG. 2, search web server 220 communicates with search results service 222, and history answer service 228. In an embodiment, the search web server 220 only communicates with one or two of services 222 and 228, and in other embodiments, search web server 220 communicates with both. In an embodiment of the present invention, when search web server 220 receives a user-defined query from user device 210, search web server 220 forwards that query to search results service 222. Additionally, search web server 220 can forward the query to history answer service 228, which provides the query to the user activity database 226.

Search web server 220 can also be configured to perform authentication and verification services associated with users who subscribe to particular services or establish accounts associated with search service 212. In other embodiments, these services can be performed by another component of search service 212 such as history answer service 228 or a component not illustrated in FIG. 2. In an embodiment, a user may be able to establish an account or subscription to services, and thereby be assigned a permanent or dynamic user identifier (UID). A user may have an associated user profile that is identified by the user's UID. In various embodiments, users who do not establish an account of subscription to services may still have an associated user profile that is identified by some other type of identifier such as, for example, an MID. According to embodiments of the present disclosure, the profile can include, or be associated with, a user's history profile that is maintained in the user activity database 226. A user profile can include information about the user such as, for example, the user's name, demographic information, authentication information (e.g., username, password, security question, etc.), preference information, and the like. As used herein, a user's history profile can include information such as search history information, MIDs used by the user in the past, search results ranking information, preference information, search result page configuration preferences, and the like.

According to embodiments of the present invention, users can utilize search service 212 either as authenticated users or as unauthenticated users. When a user utilizes search service 212 as an unauthenticated user, he or she does so without signing in (e.g., logging in). As used herein, signing in can refer to any number of processes by which a user declares his or her identity to search service 212 and verifies the accuracy of that declared identity. These processes are well-known in the art (e.g., logging in by providing a username and password) and the details thereof are not germane to the present disclosure. When a user utilizes search service 212 as an unauthenticated user, the user, and information associated with the user, can be identified by a session identifier (SID) or an MID, or both. In some embodiments, the SID can be the MID, and in other embodiments, the SID and the MID are different. In an embodiment, for example, information collected during an unauthenticated user's session is associated with the corresponding SID. In another embodiment, the information can be associated with both an SID and a distinct MID. According to embodiments, information collected during an unauthenticated user's search session can be discarded after the search session is terminated. In other embodiment, information collected during an unauthenticated user's search session can be retained for as long as desired, so that the information is available for reference in any number of subsequent search sessions.

When a user utilizes search service 212 as an authenticated user, information collected, provided, and otherwise communicated during the session can be associated with the user's UID and maintained for as long as desired, so that the information is available for reference in any number of subsequent search sessions. In embodiments, the information can be also associated with the SID and/or an MID, although it should be recognized that a user may utilize search service 212 via different user devices 210 at different times, such that the corresponding MID may not always be the same. Moreover, as with unauthenticated users, in some embodiments, the SID can be the same as the MID or the UID, while in other embodiments, the any of the SID, MID, and UID can be different from the others. Throughout the present disclosure, for the purpose of brevity, SID is intended to refer to any identifier that is used to identify information associated with a search session, and can include an MID and/or a UID. Moreover, it should be understood that many or all of the same functionalities, services, features, and the like available to authenticated users can be available to unauthenticated users according to embodiments of the present invention.

As used herein, history information refers to information that reflects the activity of a user and the search service 212, and can include data representations of search queries issued by the user, search results provided to the user in response to search queries, selection indications that indicate that the user has selected a search result or other content link, dwell time (indicating the amount of time a user spends at a particular content site or viewing a search results page), and any other type of activity that can be monitored and recorded by tracking a user's inputs. Data representations, as referred to throughout the present disclosure, mean information that can be stored and accessed, and can take the form of any number of different types of formats. In embodiments of the present disclosure, each instance of history information collected and recorded is time-stamped.

With continued reference to FIG. 2, the exemplary networking environment 200 includes search results service 222. Search results service 222 can include a search engine, crawling component, querying component, or the like. In an embodiment, search results service 222 is configured to receive a submitted query and to use the query to perform a search, such as by traversing a web index 224 to identify content satisfying the terms of the user-defined search query. This function of the search web server 220 is available to all users, and in various embodiments, is performed using any number of various algorithms to identify algorithmic search results. As used herein, algorithmic search results refer to search results that are identified by the search web server using an algorithm that does not include using the history answer service 228 or the methods disclosed herein for identifying potential re-find intent and targets. Nevertheless, it will be apparent to those of ordinary skill in the art that an algorithmic search result can be identified, ranked, ordered, and the like, using processes that utilize the history profile in other ways such as by identifying user behavior trends, identifying frequently visited search results, and the like.

In an embodiment, upon identifying search results that satisfy the search query, search results service 222 returns a set of search results to user device 210 by way of a graphical interface generated by search web server 220. A set of search results includes representations of content or content sites (e.g., web-pages, databases, or the like that contain content) that are deemed to be relevant to the user-defined search query. Search results can be presented, for example, as content links, snippets, thumbnails, summaries, and the like. Content links refer to selectable representations of content or content sites that correspond to an address for the associated content. For example, a content link can be a selectable representation corresponding to a uniform resource locator (URL), IP address, or other type of address. That way, selection of a content link can result in redirection of the user's browser to the corresponding address, whereby the user can access the associated content. One commonly used example of a content link is a hyperlink.

According to embodiments of the present invention, a data representation of each search query and the set of search results provided in response thereto is recorded in the user activity database 226. Additionally, when a user selects a content link, a selection indication can be generated that informs search service 212 that the user has selected the content link. In embodiments, a representation of the selection indication is also recorded and time-stamped such that the search results viewed by the user can be tracked, as well as the time spent viewing the associated content.

Search results can include representations of content of any kind such as, for example, a list of documents, files, or other instances of content that satisfy the search terms of the query. In an embodiment, search results include the actual content that satisfies the search query. In other embodiments, search results include links to content, suggestions for related queries, and the like. In an embodiment, search results service 222 communicates a message to user device 210 if the submitted query does not yield any results. The message informs user device 210 that the submitted query did not yield any results. In another embodiment, search results service 222 communicates information about the failure to obtain results to search web server 220, which sends a notification to user device 210 indicating the same.

As further illustrated in FIG. 2, exemplary networking environment 200 includes history answer service 228. History answer service 228 facilitates the collection of search history information associated with a user, as well as the determination and display of personalized history answers on the search results page. When a user begins searching for content using search service 212, a search session is instantiated. In embodiments, the search session is instantiated by history answer service 228, and in other embodiments, the search session can be instantiated by search web server 220. As used herein, a search session refers to a variable length of time during which a user is utilizing search service 212 to search for content. In an embodiment, each session is identified by an SID and/or a UID. In an embodiment, history answer service 228 associates an SID with an instantiated search session, and in other embodiments, the SID can be associated with the session by another component such as, for example, search web server 220. Throughout the course of a session, the associated SID is used for various purposes, including, for example, to keep track of history information collected during the session. That is to say that, when history information is collected and recorded, it is associated with the SID corresponding to the search session to which the history information pertains. For authenticated users, the history information is also associated with the UID corresponding to the authenticated user.

As mentioned above, a search session refers to a variable length of time. The length of time of a search session is configurable, and can be either predetermined, dynamically determined, or determined according to occurrence of particular events. For example, in an embodiment, a search session can be defined by a predetermined amount of time, for example an hour. In this case, the predetermined amount of time can be thought of as a cap, or an upper bound, on the amount of time during which a particular SID will be associated with a user's search history. Thus, if a user actively searches for content using search service 212 for twenty minutes and then navigates away from search service 212, the search session can be terminated, as it does not make sense to allow a session to continue to run in the absence of user activity. It should be understood that various types of thresholds and rules can be established for determining when a search session should be terminated, so as to allow for instances where a user may temporarily engage in an unrelated task, and return to the search session.

In other embodiments, the time period constituting a search session can be dynamically determined. For example, search service 212 may present an option to the user that allows the user to manually configure the time for each search session. In further embodiments, the time period corresponding to a search session may be determined based on the level of user activity, the nature of user activity, or the like. In some cases, search session time periods can be configured based on bandwidth requirements, business rules, or other various types of considerations. In still further embodiments of the present disclosure, the length of a search session can be determined by the occurrence of certain events. For example, a search session can be instantiated upon the occurrence of an event such as the user first navigating to search service 212, the user changing states from unauthenticated to authenticated by signing in, and the like.

According to embodiments of the present disclosure, history answer service 228 performs the operations necessary to provide users with personalized history answers to search queries issued by the user. That is, during the course of a search session, as queries are issued by the user, history answer service 228 analyzes the queries and the history profile corresponding to the user, which is stored in user activity database 226, to infer whether or not each search query reflects an intent by the user to re-find information that the user has previously viewed. Personalized answers satisfying a search query are displayed to the user, and subsequent activity associated with the user can be used to refine the inference process, thereby increasing the accuracy and effectiveness of the service over time.

According to embodiments of the present invention, history answer service 228 determines whether a search query reflects user intent to re-find one or more previous search results by comparing the search query to search queries previously issued by the user. For example, in an embodiment, history answer service 228 references data characterizations of search queries previously issued by the user to determine whether any of the search queries are similar to the currently issued query. A search query can be similar to another search query where the two queries have linguistic similarity, e.g., where the two queries have similar terms, grammatical structure, and the like. In embodiments of the present invention, the focus is on finding queries that reflect similar user intent, which may or may not include queries that have linguistic similarities.

In one embodiment, history answer service 228 identifies similar search queries by determining that the currently issued query is a reformulation of a previously issued query or that the previously issued query is a reformulation of the currently issued query. A reformulation of a query, as used herein, can be a query that includes search terms that express a similar meaning to the terms included in a previous query such as, for example, where one or more of the terms of the currently issued query are synonyms or hypernyms of one or more of the terms of the previously issued query. As used herein, a hypernym can include a word that has a similar meaning, a similar grammatical role in the context of a phrase or sentence, a similar characteristic, or the like. For example, consider the following sentence: "Mary washes her cat, which is red and fluffy". In this sentence, the words "cat," "red," and "fluffy" may all be hypernym. Additionally, "she," "her," and "woman" are examples of potential hypernyms for the word "Mary". Synonyms are words that have the same or similar meaning, and examples of synonyms are well-understood to those having ordinary skill in the relevant art.

In embodiments, a reformulation of a query is identified with respect to the differences is which the two queries are crafted. Some illustrative examples of differences between two queries that are reformulations of each other are depicted in Table 1, which lists the illustrative difference in the left column and an example illustrating the illustrative difference in the right column. It should be understood that the illustrative examples depicted in Table 1 represent examples of differences that may be present in reformulations of queries, and that there may be many other types of differences and other characteristics by which reformulated queries can be identified.

TABLE 1

| Difference | Example |
| --- | --- |
| Exact (No Difference) | "California raisins" and "California raisins" |
| Capitalization | "Air France" and "air france" |
| Extra Whitespace | "nick drake" and "nick  drake" |
| Stop words | "atlas Missouri" and "atlas of Missouri" |
| Non-alphanumerics | "sub-urban" and "sub urban" |
| Duplicate Words | "wild animal" and "wild wild animal" |
| Word Merge | "all gone" and "allgone" |
| Domain | "ipsum.com" and "ipsum" |
| Stemming and Pluralization | "island for sale" and "islands for sale" |
| Word Swaps | "American embassy" and "American consulate" |
| Add/Remove Word | "orange county venues" and "orange county music venues" |
| Add/Remove Noun, Phrase, or Location | "Wild Adventures in Valdosta Ga" and "Wild Adventures" |
| Abbreviations | "ba" and "British Airways" |
| Synonyms | "practical jokes" and "pranks" |
| Misspellings | "animal" and "amimal" |
| Word Substitution | "tennis star" and "Boris Becker" |
| Word order | "New York Supreme Court" and "Supreme Court of New York" |

According to another embodiment of the present invention, history answer service 228 utilizes the search results identified by search results service 222 as being relevant to a current query in determining whether the current query reflects user intent to re-find one or more previous search results. For example, in an embodiment, history answer service 228 can compare any number of the currently identified search results to data representations of search results in the user's history profile to determine whether any of the results have been previously returned in response to a query issued by the user. In other embodiments, history answer service 228 examines selection indications that correspond to data representations of search results. In further embodiments, history answer service utilizes a statistical technique such as Bayesian networks, regression, and the like to determine (e.g., predict) the user intent reflected by a current query. Other techniques and algorithms can be used to determine that a query reflects user intent to re-find previous information, and all of these are within the ambit of the present disclosure.

Moreover, to achieve further accuracy in assessing the user intent of queries, embodiments of the present invention include the ability to learn based on information collected about a user's behavior. For example, the number of times that a user visits a particular content site, issues a particular query, and the like can be monitored and incorporated into the determination. Other click-through behaviors, dwell time data, and the like can be used to refine the inference process described herein. As a simple illustrative example, suppose that a user issues a first query and is provided with a first set of search results in return and that the user clicks on one of the results and spends ten minutes viewing the content (i.e., the dwell time is ten minutes). Now suppose that, in a subsequent search session, the user issues a second query that is similar to the first query. History answer service 228 may return the result that the user previously selected and viewed. Each time that the user selects and views that particular content after retrieving the link to the content as a result of issuance of a search query, the probability increases that the user is intending to re-find that content when issuing a similar query. Similarly, if a particular search result is provided to the user in response to several different, but similar, queries, and the user never clicks on the link to that content (e.g., there are no selection indications in the user's history profile that correspond to that content link), history answer service 228 may cease to return that content link as part of the history answer service's 228 personalized answer. These examples are not intended to limit the scope of learning abilities that can be exhibited by history answer service 228, and it should be recognized that other individuals may be able to achieve improved history answer results based on variations on the concepts described herein, and those variations are within the scope of the present disclosure.

Upon determining that a current search query reflects user intent to re-find one or more search results provided to the user in response to one or more previously issued search queries, history answer service 228 can cause search web server 220, the user's browser, or some other component to display representations of the search results, which can include hyperlinks to the corresponding content links. In some embodiments, history answer service 228 subjects the search results to a set of re-find firing constraints before sending the search results on to be displayed to the user. In some cases, there may be a risk of the history answer over-firing such as, for example, when a user is involved with a task-based search session. During such a session, a user may conduct a number of searches related to the same topic, which may result in a number of similar queries being issued by the user. Some embodiments of the present invention incorporate re-find firing constraints so as not to burden the user with needless repetition of personalized search results being provided.

In an embodiment, a configurable buffer window of time is provided to prevent a previously issued query from being considered as a similar query for the purposes of determining re-finding intent when the previously issued query was recently issued by the user. For example, the query may be considered to have been recently issued if it was issued within the same user session. In another embodiment, the configurable buffer window can apply to queries issued in previous search sessions, and an initial time value can be established for the buffer window such as, for example, thirty minutes. Although other initial values can be used in embodiments of the present invention, a thirty minute buffer may be appropriate because studies show that re-finding information tends to become the dominant behavior for users after the user has already engaged in thirty minutes of searching. Thus, according to embodiments of the present invention, if queries that return the same search result are issued more than once within a thirty minute period, the corresponding search result will not be considered for the personalized history answer incident to the second issuance of the query.

Figure 3:
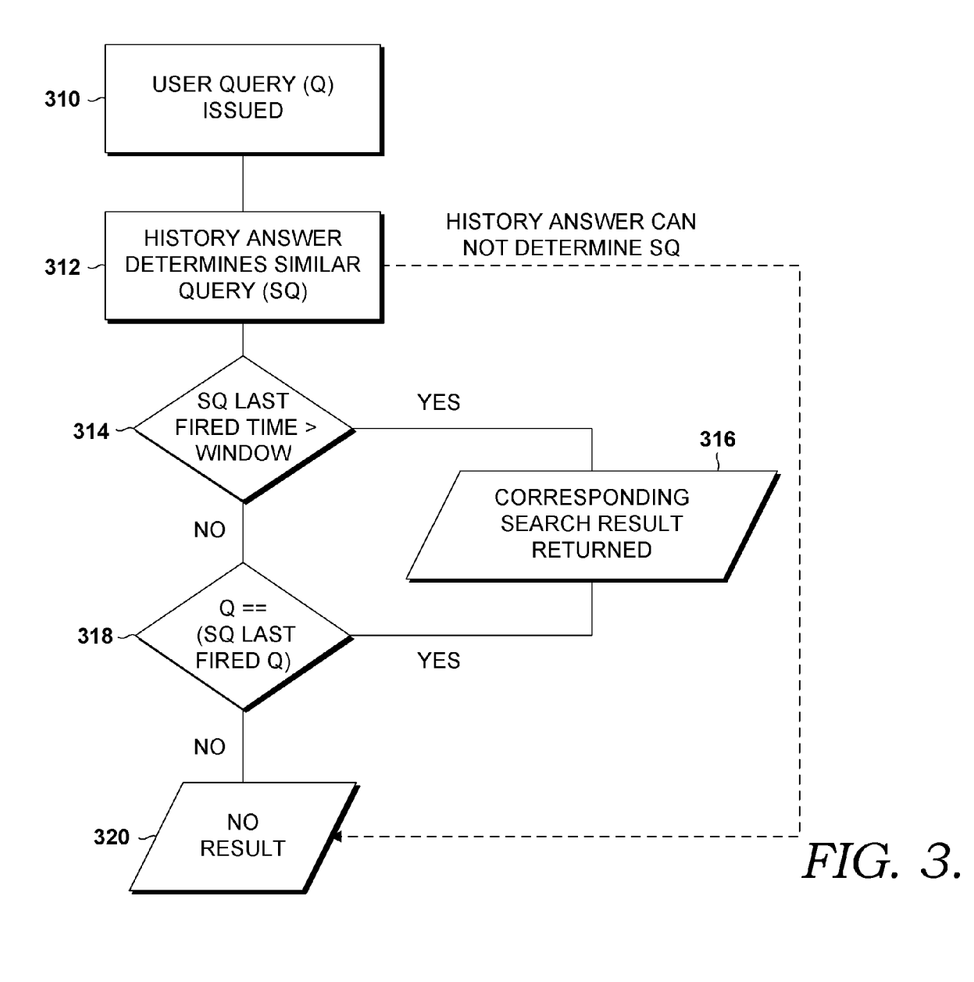
FIG. 3 is a flow diagram illustrating an exemplary method for applying re-find firing constraints to a personalized history answer according to embodiments of the present invention.

In other embodiments, further constraints can be used to prevent over-firing of the query. In one embodiment, to provide deterministic results to the user, two identical queries fired within the buffer window may result in the return of the corresponding search result as a personalized history answer to the second query. An illustrative method of such a configuration is depicted in FIG. 3, and will be briefly discussed below. According to other embodiments of the present invention, however, any combination and type of firing restrictions can be used to preserve a positive and helpful experience for the user. In still further embodiments, the present invention can be implemented without incorporating firing restrictions.

Turning briefly to FIG. 3, an exemplary method of providing a personalized answer to a search query, where the exemplary method includes applying a set of re-find firing constraints to a search result identified as a probable user intent target. As illustrated at 310, a search query (Q) is issued by the user. At step 312, the history answer service determines a similar query, i.e., a query that reflects a similar user intent to find a particular search result, and a corresponding search result that the user may be intending to re-find. As illustrated by the dotted arrow directed to step 320, if the history answer service does not determine a similar query, no personalized history answer is returned. However, if a similar query (SQ) is identified, a determination is made at step 314 whether the configurable buffer window time has passed since the similar query was issued. If the last time the corresponding search result was fired was outside of the window (e.g., more than thirty minutes prior to the issuance of the current query (Q)), then the corresponding search result is returned, as illustrated at step 316. If the search result corresponding to the similar query was issued within the window, a determination is made at step 318 whether the current query is identical to the similar query. If the two queries are identical, the corresponding search result is fired, as illustrated at step 316. If not, no result is returned, as shown at step 320.

Figure 4:
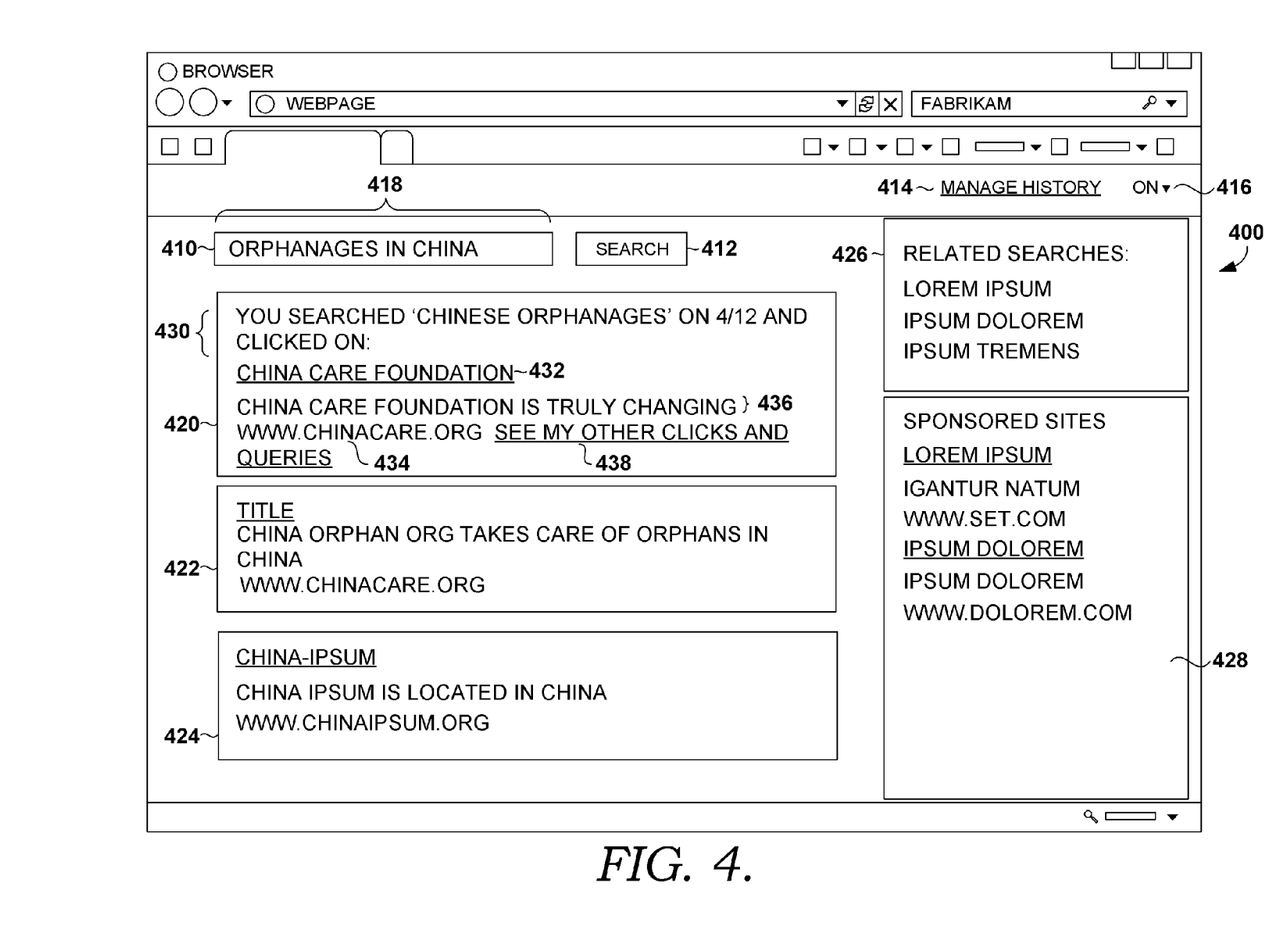
FIG. 4 depicts an illustrative search results page that includes personalized history answers according to embodiments of the present invention.

Turning now to FIG. 4, an exemplary search results page 400 is depicted in accordance with an embodiment of the present invention. Search results page 400 includes an input field 410 for allowing a user to submit a search query by typing in search terms. Search results page 400 also includes a selectable button 412 for initiating a search, an option 414 for managing a search history profile by requesting a management module, and an option 416 for toggling the state of the history answer service and/or module that collects user search behavior information. Upon issuance of a query 418, the search results page 400 displays a set of search results 420, 422, and 424, a related searches module 426, and a sponsored sites module 428.

The management module, which is not shown in FIG. 4, but is selectable via option 414, can include any number of different types of user-interfaces adapted to allow a user to configure the search results page 400 and the associated search session and personalized history answer experiences. For instance, by selecting the option 414, the user can be provided with options for determining how and when history information will be recorded, presented, and the like. Options can be provided for configuring the size, shape, appearance, and functionality of the personalized history answer 420. In some embodiments, options can be provided for removing history information from the online database, for adding information to the database, for setting preferences, and the like. In embodiments, the user may be able to configure the type of information displayed on the search results page or in the session tracker module. For example, in one embodiment, the user can optionally configure the rules by which previous queries are selected to be presented as personalized history answers. According to embodiments of the present invention, any number of the features and functionalities discussed herein can be configurable by the user via some form of a management module.

As illustrated, the set of search results 420, 422, and 424 includes a number of representations of relevant content. Each representation of content includes a title 432, addressing information 434 (e.g., a URL), and a caption 436. In embodiments, a representation can include a content link that corresponds to a URL 434 or other address such that selection of the content link causes redirection of the user's browser to the associated content site. For example, in FIG. 4, the title 432 of each representation of content is also a content link such as a hyperlink. The title 432 can include the name of the content site, the name of a company that sponsors the content site, a phrase that represents the content, or the like. Similarly, the caption 436 can include snippets from the relevant content, a summary of the content, or the like. According to various embodiments of the present invention, any number of search results can be displayed in the set of search results 420, 422, and 424. Additionally, the search results 420, 422, and 424 can be ranked according to various metrics and ranking schemes and can be displayed according to rank.

The personalized history answer 420 includes one or more search results that can be displayed in any number of ways including as the top result in a list of traditional algorithmic search results, as the last result on a first page of traditional algorithmic search results, by filtering the algorithmic list of search results to display the history answer, and the like. In embodiments, the personalized history answer search results can be displayed using a different color, in a different screen or column, with other display effects such as bold, underline, italics, etc., in a different size, accompanied with an icon, and the like. According to some embodiments, only one search result is displayed as the personalized history answer. In other embodiments, the a number of search results can be displayed as the personalized history answer.

In the embodiment illustrated in FIG. 4, the personalized history answer 420 is displayed at the top of a list of search results 420, 422, and 424. As illustrated, the history answer 420 includes a brief description 430 that identifies the nature of the history answer 420 and provides the user with more detailed information regarding the history answer. The history answer 420 also includes a selectable option 438 for viewing additional information from the user's history profile such as, for example, additional representations of previously issued search queries and corresponding search results.

Figure 5:
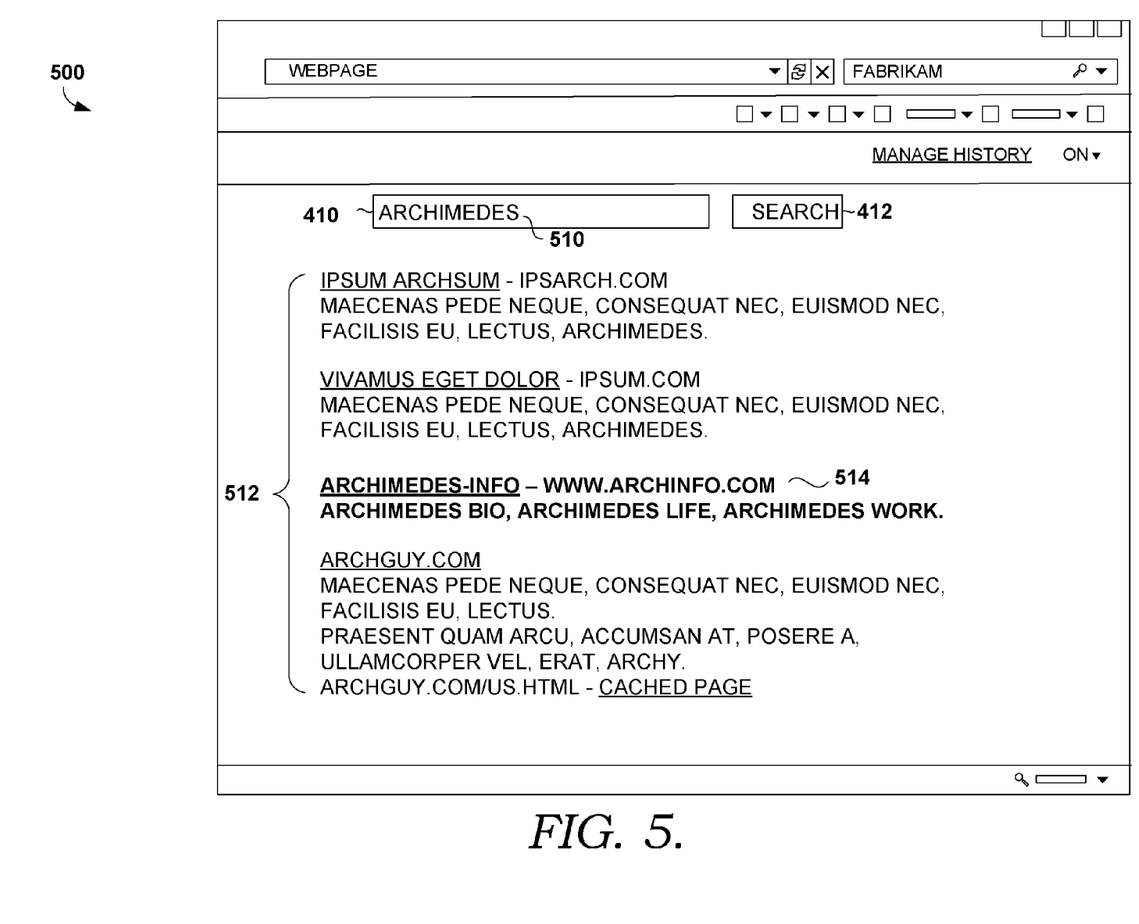
FIG. 5 depicts another illustrative search results page that includes personalized history answers according to embodiments of the present invention.

An alternative embodiment of the present invention is depicted in FIG. 5, which shows an illustrative search results page 500 in accordance with embodiments of the present invention. Incident to a user issuing a search query 510, a set of search results 512 is displayed to the user. The personalized history answer 514 is displayed using bold font to call user attention to that result. Additionally, as indicated above, other display techniques can be used to highlight the importance and/or presence of the personalized history answer 514, and all of these techniques are considered to be within the ambit of the present disclosure.

Figure 6:
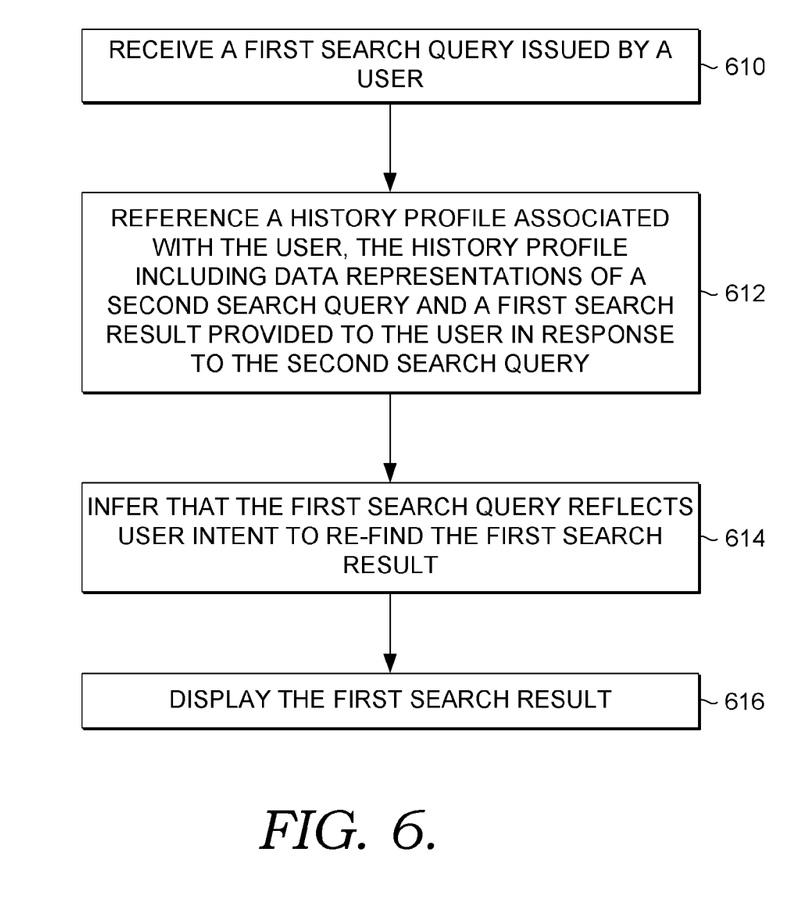
FIG. 6 is a flow diagram illustrating an exemplary method for providing a personalized answer to a user-defined search query based on the user's search history according to embodiments of the present invention.

Turning now to FIG. 6, a flow diagram is provided that illustrates an exemplary method for providing a personalized answer to a user-defined search query based on the user's search history. The exemplary method includes, at a first illustrative step 610 receiving a first search query issued by a user. According to embodiments of the present invention, the first search query includes a first search term or terms that define the parameters of the search query. According to a second step 612, a history profile associated with the user is referenced. In embodiments, the history profile includes data representations of a second search query and a first search result that was provided to the user in response to the second search query. In some embodiments, the history profile includes selection indications corresponding to search results that the user selected. The history profile can also include dwell-time values that indicate the amount of time the user spent viewing a particular search result.

According to various embodiments of the present invention, referencing the history profile includes comparing a current search query to data representations of search queries associated with the history profile. In other embodiments, referencing the history profile includes comparing search queries and corresponding search results associated with the history profile to other search queries and results associated with the history profile. For example, in one embodiment, referencing the history profile includes determining that a first and second search query are the same (i.e., the first and second search queries are comprised of identical search terms). In other embodiments, referencing the history profile includes determining that the first and second search queries are similar. For example, in an embodiment, referencing the history profile can include determining that one of the queries is a reformulation of the other, as discussed above with respect to FIG. 2. In still further embodiments, referencing the history profile can include determining that two or more search queries correspond to a search result that was selected by the user each time that the result was provided to the user.

The exemplary method illustrated in FIG. 6 further includes, at a step 614, inferring that the first search query reflects user intent to re-find the first search result. At a final, illustrative step 616, the first search result is displayed. According to an embodiment, the first result can include a content link such that the user can access the corresponding content. In other embodiments, a representation (selectable or non-selectable) of the previously issued (second) search query can be displayed to the user so that the user can reissue the second query and retrieve all of the search results.

Figure 7:
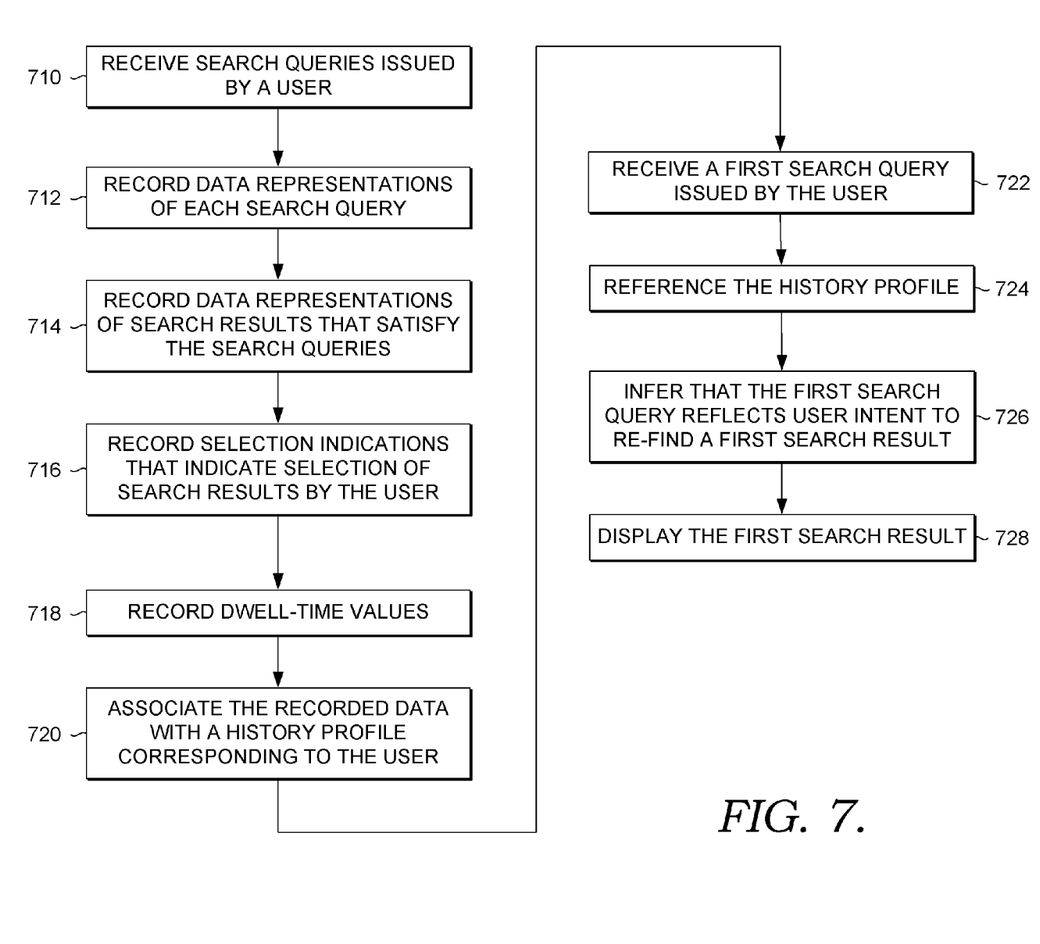
FIG. 7 is another flow diagram illustrating an exemplary method for providing a personalized answer to a user-defined search query based on the user's search history according to embodiments of the present invention.

Turning now to FIG. 7, another flow diagram is provided that illustrates a second exemplary method for providing a personalized answer to a user-defined search query based on the user's search history. At a first step 710, a number of search queries issued by a user are received and, as shown at step 712, data representations of each of the search queries are recorded. At step 714, data representations of search results that satisfy the search queries are recorded. The search results can be algorithmic search results identified by the search engine's algorithms. In other embodiments, the search results can include personalized search results of various kinds. Additional data related to the search results can be recorded such as, for example, ranking indications, popularity metrics, ratings, and the like.

As shown at step 716, selection indications corresponding to the search results are recorded. Selection indications are received, as described above, when a user selects one of the search results provided in response to a search query. The selection indications can include information sufficient to identify the search query with which it is associated, the search result with which it is associated, a time-stamp, and the like. At step 718, dwell-time values corresponding to each of the selection indications. As illustrated at step 720, all of the recorded data (e.g., data representations of search queries and results, selection indications, and dwell time values) is associated with a history profile corresponding to the user. In some embodiments, each piece of recorded data is associated with the history profile as it is being recorded.

With continued reference to FIG. 7, at step 722, a first search query issued by the user is received. In response to receiving the first search query, the user's history profile is referenced, as indicated at step 724. Using some or all of the information within the user's history profile, at step 726, an inference is generated that the first search query reflects user intent to re-find a first search result, where the first search result was previously provided to the user in response to a second search query. According to embodiments of the present invention, inferring that the first search query reflects user intent to re-find the first search result includes determining that the first search query is a reformulation of the second search query. In another embodiment, the step of inferring includes referencing one or more selection indications and determining that a corresponding dwell-time value exceeds a predetermined threshold. In other embodiments, Bayesian networks and/or other mathematical modeling techniques can be used to infer that the first search query reflects user intent to re-find the first search result. At a final illustrative step 728, the first search result is displayed to the user.

Figure 8:
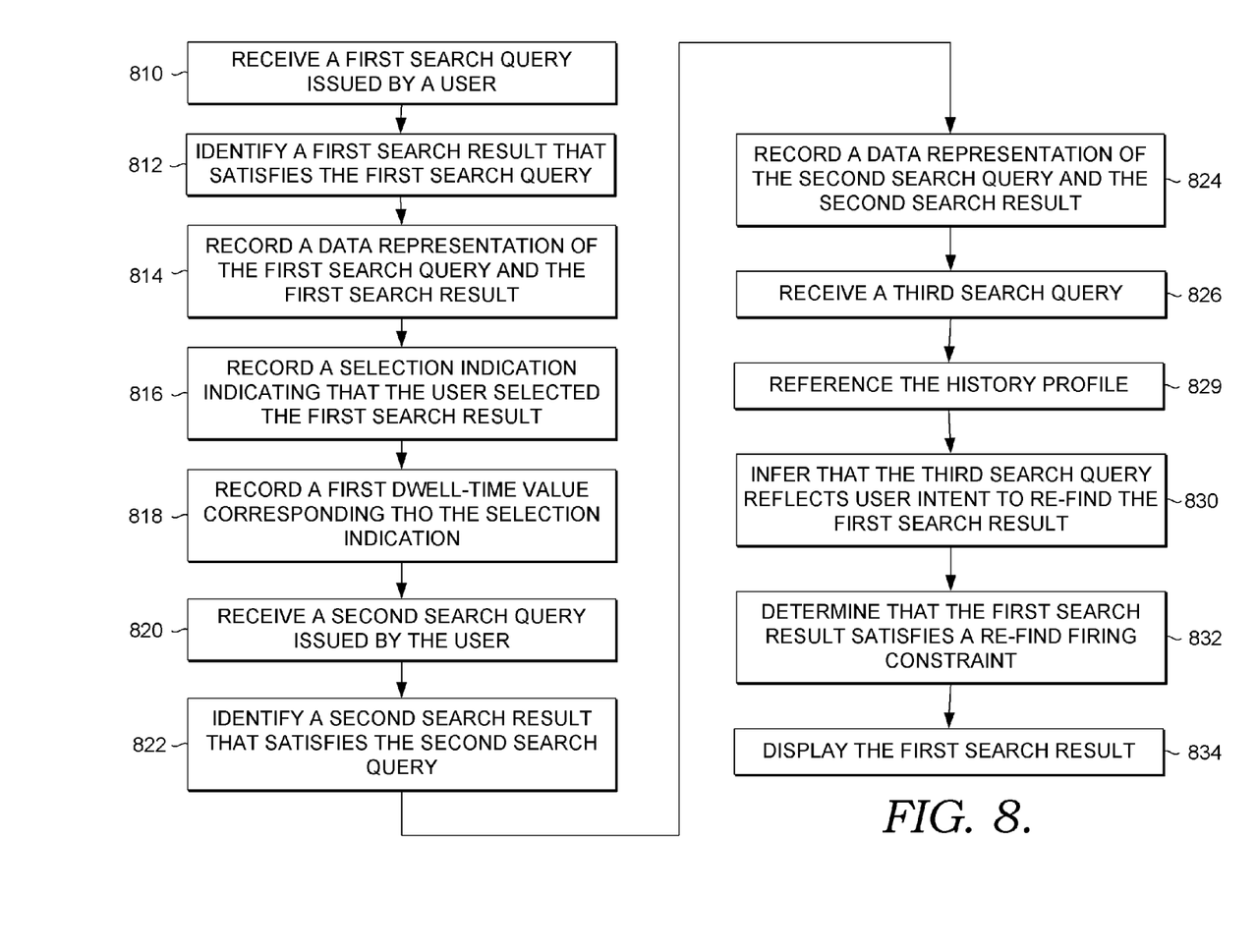
FIG. 8 is another flow diagram illustrating an exemplary method for providing a personalized answer to a user-defined search query based on the user's search history according to embodiments of the present invention.

Turning to FIG. 8, a final flow diagram is provided that illustrates another exemplary method for providing a personalized answer to a user-defined search query based on the user's search history. At an initial illustrative step 810, a first search query issued by a user is received and a first search result that satisfies the first search query is identified at step 812. Data representations of the first search query and first search result are recorded, as shown at step 814. Additionally, upon the user's selection of a first search result, a selection indication indicating that the user selected the result is recorded at step 816. A dwell-time value corresponding to the user's time spent viewing the search result is recorded at step 818.

As shown at step 820, a second search query issued by the user is received and a second search result that satisfies the second search query is identified, as shown at step 822. Data representations of the second search query and result are recorded at step 824. At step 826, a third search query is received. The history profile associated with the user is referenced at step 828 and, as shown at step 830, information contained in the history profile is used to infer that the third search query reflects user intent to re-find the first search result. At step 832, the first search result is determined to satisfy a re-find firing constraint. In a final illustrative step 834, the first search result is displayed. In an embodiment, a number of algorithmic search results are also identified that satisfy the third search query. The first search result may or may not be one of the number of algorithmic results. The algorithmic search results can be displayed as a list, for example, and the first search result can be displayed at the top of the list. In other embodiments, the first search result can be displayed at other positions within the list and can be displayed with any number of text effects or graphics that help draw the user's attention to the personalized history answer.

The present invention has been described in relation to particular embodiments, which are intended in all respects to be illustrative rather than restrictive. Alternative embodiments will become apparent to those of ordinary skill in the art to which the present invention pertains without departing from its scope and may include, for example, providing varying types of services depending on user preferences or subscription status. Other embodiments can include various forms of privacy measures including encryption of history information, multiple levels of passwords, and the like.

What is claimed is:

1. One or more computer-readable storage media having machine-useable instructions embodied thereon for performing a method for providing a personalized history answer to a user-defined search query based on the user's search history, the method comprising:
receiving a second search query issued by a user
referencing a history profile corresponding to the user, the history profile comprising a data representation of a first search result within a first set of search results provided to the user, wherein the first search result within the first set of search results was provided to the user in response to receiving a selection indication corresponding to the first search result within the first set of search results indicating that the user selected the first search result within the first set of search results;
inferring that the second search query reflects user intent to re-find the first search result within the first set of search results; and
simultaneously providing the first search result and a set of algorithmic search results in response to the second search query for presentation to the user, wherein the first search result is displayed as the personalized history answer and is displayed differently than the set of algorithmic search results.

2. The media of claim 1, wherein the history profile further comprises a selection indication corresponding to the first search result that indicates that the user selected the first search result.

3. The media of claim 2, wherein the history profile further comprises a first dwell-time value that indicates the amount of time that the user spent viewing the first search result.

4. The media of claim 1, wherein the history profile further comprises a data representation of a second search result provided to the user, wherein the second search result was provided to the user in response to receiving a third search query issued by the user.

5. The media of claim 4, wherein referencing the history profile comprises determining that the first and second search results are the same.

6. The media of claim 5, wherein said inferring comprises determining that the first search query comprises a reformulation of at least one of the first and second search queries.

7. One or more computer-readable storage media having machine-useable instructions embodied thereon for performing a method for providing a personalized history answer to a user-defined search query by utilizing the user's history, the method comprising:
receiving a plurality of search queries issued by a user;
recording a data representation of each of the plurality of search queries;
providing a plurality of search results to the user, wherein each search result satisfies one of the plurality of search queries;
recording a data representation of each of the plurality of search results;
receiving a selection indication from the user, wherein the selection indication indicates that the user selected a first search result from one of the plurality of search results;
recording the selection indication;
associating the recorded data representations and the selection indication with a history profile corresponding to the user;
receiving a first search query issued by the user;
referencing the history profile;
inferring that the first search query reflects user intent to re-find the first search result, wherein said inferring comprises determining that the first search query comprises a reformulation of a second one of the plurality of search queries; and
simultaneously providing the first search result and a set of algorithmic search results in response to the first search query for presentation to the user, wherein the first search result is displayed as the personalized history answer and is displayed differently than the set of algorithmic search results.

8. The media of claim 7, further comprising recording a plurality of dwell-time values, wherein each dwell-time value indicates an amount of time that the user spent viewing one of the plurality of search results.

9. The media of claim 8, wherein said inferring further comprises referencing at least one of a first one of a plurality of selection indications and a first one of the plurality of dwell-time values.

10. The media of claim 9, wherein said inferring further comprises that the first one of the dwell-time values exceeds a predetermined threshold.

11. The media of claim 7, further comprising determining that the first search result satisfies a re-find firing constraint.

12. The media of claim 11, wherein determining that the first search result satisfies the re-find firing constraint comprises determining that a predetermined amount of time has passed since the first search result was provided to the user.

13. The media of claim 11, further comprising:
receiving a second search query issued by the user;
referencing the history profile;
inferring that the second search query reflects user intent to re-find the first search result; and
providing the first search result for display to the user, wherein determining that the first search result satisfies the re-find firing constraint comprises determining that the first and second search queries are the same.

14. The media of claim 7, wherein the personalized history answer can be displayed using a different color, in a different screen or column, accompanied by an icon, or displayed using display effects including bolding, underlining, or italics.

15. One or more computer-readable storage media having machine-useable instructions embodied thereon for performing a method for providing a personalized history answer to a user-defined search query by utilizing the user's history, the method comprising:
receiving a first search query issued by a user, wherein the first search query comprises a first search term;
identifying a first search result within a first set of search results that satisfies the first search query;
recording a data representation of the first search query and a data representation of the first search result, wherein the data representations of the first search query and first search result are associated with a history profile that corresponds to the user;
receiving a second search query issued by the user, wherein the second search query comprises a second search term;
identifying a second search result within a second set of search results that satisfies the second search query;
recording a data representation of each of the second search query and the second search result, wherein the data representations of the second search query and second search result are associated with the history profile;
receiving a third search query, wherein the third search query comprises a third search term;
referencing the history profile;
inferring that the third search query reflects user intent to re-find the first search result, wherein said inferring comprises determining that the first and second search results are the same;
determining that the first search result satisfies a re-find firing constraint, wherein determining that the first search result satisfies the re-find firing constraint comprises determining whether a predetermined period of time has passed:
(1) if the predetermined period of time has passed, providing the first search result for presentation to the user in response to the third search query as the personalized history answer; and
(2) if the predetermined period of time has not passed, determining that the first and third search queries are the same and providing the first search result for presentation to the user in response to the third search query as the personalized history answer.

16. The media of claim 15, wherein said inferring further comprises determining that the third search query comprises a reformulation of at least one of the first and second search queries.

17. The media of claim 15, further comprising recording a selection indication, wherein the selection indication indicates that the user selected the first search result when the first search result was provided to the user in response to the first search query issued by the user.

18. The media of claim 17, further comprising recording a first dwell-time value corresponding to the first selection indication, wherein the first dwell-time value indicates an amount of time that the user spent viewing the first search result.

19. The media of claim 15, further comprising:
receiving a fourth search query issued by the user, wherein the first and fourth search queries are the same;
identifying a third search result satisfying the fourth search query, wherein the first and third search results are different;
recording a second selection indication indicating that the user selected the third search result;
recording a second dwell-time value corresponding to the third search result, wherein the second dwell-time value indicates an amount of time that the user spent viewing the third search result; and
inferring that the fourth search query reflects user intent to re-find the fourth search result, wherein said inferring comprises determining that the second dwell-time value is greater than the first dwell-time value.

20. The media of claim 15, further comprising:
identifying a plurality of algorithmic search results that satisfy the third search query, wherein the plurality of algorithmic search results comprises the first search result; and
providing the plurality of algorithmic search results as a list for display to the user, wherein the first search result is displayed at the top of the list.

* * * * *